United States Patent Office 3,431,128
Patented Mar. 4, 1969

3,431,128
ASPHALTIC COATING COMPOSITIONS CONTAINING N-ALKYL AMINO ACIDS
Thornton K. Jones, San Rafael, Calif., assignor to Chevron Research Company, a corporation of Delaware
No Drawing. Filed Mar. 25, 1964, Ser. No. 354,781
U.S. Cl. 106—273  4 Claims
Int. Cl. C08h 13/00; C09d 3/24; B32b 11/00

This invention relates to asphaltic coating compositions displaying increased resistance to deterioration produced by weathering. More specifically, it concerns coatings particularly suitable for roofing applications comprising oxidized or air-blown asphalts and minor amounts of certain N-alkyl amino acids.

Asphalt has been used extensively in forming protective coatings for roofs. It is commonly employed in making sheet or roll type covering and shingles, and is also frequently applied in molten form and spread by brushing or mopping the material evenly over the roof and allowing it to solidify to form a smooth coating. Asphalts are relatively inexpensive and are especially desirable roofing materials, being waterproof, easily applied and providing protection from the elements for relatively long periods of time. While asphaltic materials are, in general, quite stable to ordinary conditions of weathering, i.e., snow, rain, sleet and sun, etc., it is important that materials of even greater stability to weathering be provided.

The manifestations of weathering deterioration in asphaltic coatings include the changes in appearance and coloration, wrinkling, cracks and pin holes, etc. Commonly, small cracks or "checks" appear in the coating and these cracks eventually widen to produce a condition described as "alligatoring." The appearance of these cracks, of course, diminishes the water-proof characteristics of a roof and the delaying of such deterioration is a highly desirable object in the coating and roofing art. A number of agents which have been employed in the past have been somewhat successful in extending the weathering life of asphaltic compositions in certain aspects. However, as far as is known, prior to the present invention no compositions have as yet been developed that successfully extend weathering lives of asphaltic coatings for extended periods.

I have now discovered that asphaltic coating compositions displaying superior resistance to weathering deterioration can be produced from oxidized or air-blown asphalts and minor amounts of certain N-alkyl amino acids. The substituted amino acids which are operative in this invention are those of the general formula

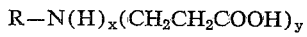

R—N(H)$_x$(CH$_2$CH$_2$COOH)$_y$ in which R is a hydrocarbon radical of from 10 to 22 carbon atoms, y is a whole number from 1 to 2, and x+y=2.

Thus the weathering additives of this invention include N-alkyl substituted β-amino acids and more specifically, β-amino propionic acids or β-alanine. The compounds may thus be of the substituted amino type containing one β-alanine group, or of the imino type wherein there are two acid groups present. The N-amino (monocarboxylic) materials are preferred.

The materials of this invention are not novel. Convenient methods of preparing them are described in U.S. Patent Nos. 2,195,974 and 2,468,012. The compounds are marketed by General Mills, Inc. as "Deriphats." They are prepared by the reaction of fatty amines with acrylic monomers. Examples of the materials are Deriphat 170C (N-lauryl-β-aminopropionic acid), Deriphat 26D (N-tallow-β-aminopropionic acid) and several other materials supplied as sodium salts, for example, Deriphat 151 (sodium N-coco-β-amino-propionate), Deriphat 154 (disodium N-tallow-β-imino-propionate) and Deriphat 160C (partial sodium salt of N-auryl-β-iminopropionate). Other materials such as the N-decyl and N-tridecyl aminopropionates are available.

Thus, the preferred materials are the β-aminopropionic acids, and more particularly the preferred compound is the N-tallow or octadecyl derivatives.

Other operable amino acids are those in which the R is branched-chain alkyl, and those in which the R is an alkenyl group. The R should contain from 10 to 22 carbon atoms, and 16 to 20 carbon atoms is preferred.

The N-alkyl amino acids of this invention are employed in the asphaltic compositions in minor proportions sufficient to impart weathering resistance. Generally, amounts of from 0.1 to 10% by weight are sufficient; amounts of from 0.1 to 5% by weight are preferred.

The amino acid additives may be introduced into the compositions either prior to the air-blowing or oxidation step, during this operation, or after the oxidized material is obtained. The preferred method is to add the amino acid to the asphalt prior to the blowing operation. The asphalt is melted during the blowing step and is under extreme agitation, and the additives will then disperse easily throughout the material. The amino acids can be introduced into the previously prepared air-blown asphalts by heating the asphalt until it is molten and stirring the additive into the molten mixture.

Asphalts suitable for use in the coating compositions of this invention are blown asphalts, including air-blown materials and those asphalts, the oxidation of which has been accelerated by means of catalysts, such as those disclosed in Abson Patent No. 1,782,186. The blown or oxidized asphalts are particularly suitable for coating by applications and generally possess desirable low temperature susceptibility, a higher softening point for a given penetration as compared with unoxidized materials, and moderately high ductility. In addition, they possess a high stability and resistance to flow, a characteristic particularly important when coatings are to be applied to surfaces which are other than horizontal.

The air-blown asphalts should have softening points above 130° F. In general, asphalts with softening points between 150° F. and 250° F. are preferred.

The stabilization, i.e., increase in resistance to weathering deterioration resulting from the addition of the amines of this invention, were determined in an accelerated weathering test. This test was conducted in a Weather-Ometer apparatus, Model DMC, manufactured by the Atlas Electric Devices Company of Chicago, Illinois. Briefly, the test involves exposing an asphalt coating on a metal panel to a carbon arc lamp, to a water spray and to cold for intermittent periods.

More specifically, the panels are prepared by the heated platen press method (ASTM D–1669–997). The asphaltic compositions were heated in an oil bath maintained at 500° F. until the desired fluidity was obtained, usually at a temperature of from 400°–425° F. Aluminum panels were masked with tape and heated to 300° F. The molten asphalt was poured onto the hot panel, covered with a sheet of Teflon, and pressed by hydraulic press platens which were heated to about 225° F. The panels were then removed from the press and allowed to cool to room temperature. The Teflon and masking tape were then removed. The thickness of the asphaltic coating was maintained at 0.025±0.001 inch. The panels thus prepared were exposed in the Weather-Ometer within 24 hours of preparation.

The panels which had been prepared by the above described method were exposed in Model DMC Weather-Ometers using the ASTM D-529-59T Daily Cycle A, which is otherwise known as the 51-9C cycle. This cycle consists of exposure to single arc light for 51 minutes at 140° F. and for 9 minutes to light plus a cold water spray. The spray water was deionized to a maximum solids content of 20 p.p.m. and cooled to 40° F.±1° F. Exposure was maintained for 22 hours per day, 5 days per week. The line voltage to the Weather-Ometers was maintained at 216 volts by an automatic voltage regulator. Power consumption by the arcs and arc control solenoids was held within the range of 1750 to 1850 watts by adjustment of the arc lamp wattage.

The panels thus prepared were exposed in sets of 4, 6 and 8 pairs in two or three machines, or in sets of 4 in two machines. The multiple exposures gave values within about 10% of the true value at the 95% confidence level.

Panel inspection was made daily by the high voltage spark technique (ASTM D-1670-59T). Briefly, this involves applying a high voltage to the aluminum backing of each panel, placing a sheet of photographic paper over the asphaltic surface and placing an electrode over the paper. Thus, where a crack has developed in the coating, a spark will jump through the paper to the electrode and upon developing the paper, an impression will remain indicating a point of coating failure, i.e., a crack. In these tests, spark voltage was held at 7500 volts and current at 180 microamperes. The spark failure pattern was recorded on Kodak "Velite" photographic paper and examined under a 60-square transparent grid. In the tests a panel was considered to have failed when cracks appeared in 30 of the squares.

Panels were prepared from asphaltic compositions derived from a California coastal residue having a penetration of 65 at 77° F.

The following example illustrates the preparation of the compositions of this invention.

Example 1

1% by weight of Deriphat 26D (N-tallow aminopropionic acid) was added to a sample of a molten blown asphalt which had been oxidized to a softening point of 215-225° F. The additive was added after the residuum had been air blown by a conventional technique.

The following table shows the results of accelerated weathering tests performed on the composition of Example 1. The tests were run by the above described method.

TABLE

| Composition | Softening point, °F. | Weather-Ometer life, days |
| --- | --- | --- |
| Asphalt | 215 | 41 |
| Asphalt and additive | 215–225 | 66 |

These data indicate that the N-substituted amino acid additives of this invention significantly improve the weathering characteristics of air-blown asphalts. Thus addition of these materials will result in the achievement of greatly extended weathering life in the manufacture of sheet, roll and mopping grade roofing asphalts, etc.

In addition to the weathering life additives of this invention, the asphaltic coating compositions may contain other materials commonly employed in coating compositions. Thus, certain fillers or extenders may be included. For example, the composition may contain from 5 to 60% by weight of granular or nonfibrous extenders, such as limestone, flue dust, slate flour, talc, ground silica, aluminum silicate ore, diatomaceous earth, etc., or from 1 to 10% by weight of fibrous extenders, for example, asbestos, mineral wool, beet sugar residues, corn stalks, bagasse, etc.

What is claimed is:

1. As a roof coating material of superior weathering ability, an air blown asphaltic composition having a ring and ball softening point in the range of 130° F. to 250° F. and containing from 0.1% to 10% by weight of an N-alkyl amino acid of the general formula $$R\text{---}N(H)_x(CH_2CH_2COOH)_y$$

in which R is an alkyl radical of from 8 to 22 carbon atoms, $y$ is a whole number of from 1 to 2, and $x+y=2$.

2. The composition of claim 1, in which R is an alkyl radical of 12 to 18 carbon atoms, and $y$ is 1.

3. The composition of claim 2, in which R is $C_{18}$.

4. The composition of claim 2, in which R is $C_{12}$.

References Cited

UNITED STATES PATENTS 3,028,249  4/1962  Hoiberg  106—273
3,126,292  3/1964  Bottero et al. _____ 106—277

FOREIGN PATENTS 599,025  5/1960  Canada.

JULIUS FROME, *Primary Examiner.*

J. B. EVANS, *Assistant Examiner.*

U.S. Cl. X.R.

106—279, 280, 281, 282; 117—168; 156—337; 161—236